United States Patent
Jialanella et al.

(10) Patent No.: US 7,556,002 B2
(45) Date of Patent: Jul. 7, 2009

(54) ADHESIVELY BONDED ENGINE AND TRANSMISSION PARTS

(75) Inventors: Gary L. Jialanella, Oxford, MI (US); David M. Courter, Clarkston, MI (US)

(73) Assignee: Dow Global Technologies Inc., Midland, MI (US)

( * ) Notice: Subject to any disclaimer, the term of this patent is extended or adjusted under 35 U.S.C. 154(b) by 993 days.

(21) Appl. No.: 10/943,540

(22) Filed: Sep. 17, 2004

(65) Prior Publication Data

US 2005/0061280 A1     Mar. 24, 2005

(51) Int. Cl.
*F01M 9/10* (2006.01)
(52) U.S. Cl. .............. 123/90.38; 123/90.33; 123/198 E
(58) Field of Classification Search .............. 123/90.33, 123/90.38, 198 E
See application file for complete search history.

(56) References Cited

U.S. PATENT DOCUMENTS

| | | | |
|---|---|---|---|
| 3,616,041 A | 10/1971 | Kehr et al. | |
| 3,625,925 A | 12/1971 | Oswald et al. | |
| 3,700,574 A | 10/1972 | Kehr et al. | |
| 3,708,413 A | 1/1973 | Kehr et al. | |
| 3,714,290 A | 1/1973 | Kehr et al. | |
| 3,729,404 A | 4/1973 | Morgan | |
| 3,966,794 A | 6/1976 | Larsen et al. | |
| 4,002,798 A * | 1/1977 | Morgan | 428/419 |
| 5,133,316 A * | 7/1992 | Kasai et al. | 123/198 E |
| 5,248,715 A * | 9/1993 | Gray et al. | 524/265 |
| 5,298,587 A | 3/1994 | Hu et al. | 528/10 |
| 5,320,875 A | 6/1994 | Hu et al. | 427/493 |
| 5,363,759 A | 11/1994 | D'Ambrosio | 100/110 |
| 5,375,569 A | 12/1994 | Santella | 123/90.38 |
| 5,433,786 A | 7/1995 | Hu et al. | 118/723 E |
| 5,492,086 A | 2/1996 | Kuhns | 123/90.38 |
| 5,494,712 A | 2/1996 | Hu et al. | 427/489 |
| 5,746,168 A | 5/1998 | Lochbrunner et al. | 123/90.38 |
| 5,883,192 A * | 3/1999 | Natori et al. | 525/98 |
| 5,959,071 A | 9/1999 | DeMoss et al. | 528/378 |
| 6,232,401 B1 | 5/2001 | Zook et al. | 525/191 |
| 6,471,820 B1 * | 10/2002 | Paulick | 156/306.9 |
| 6,777,026 B2 * | 8/2004 | Halladay et al. | 427/180 |
| 2002/0112684 A1 | 8/2002 | Jones et al. | 123/90.38 |

FOREIGN PATENT DOCUMENTS

WO     02/059197     8/2002

* cited by examiner

Primary Examiner—Zelalem Eshete

(57) ABSTRACT

In one embodiment the invention is a system and method for bonding parts to an engine or a transmission which comprises contacting with the part or the location of the engine or the transmission to which the part is to be attached an adhesive comprising a polythiol ether having two or more reactive groups capable of reacting with a curing agent and a curing agent for the polythiol ether and thereafter contacting the part with the engine or transmission such that the adhesive is disposed between them and curing the adhesive.

19 Claims, 2 Drawing Sheets

ADHESIVELY BONDED ENGINE AND TRANSMISSION PARTS

BACKGROUND OF THE INVENTION

This invention relates bonded parts to engines and transmissions. In a preferred embodiment it relates to valve cover assemblies for internal combustion engines herein the valve cover is bonded to the cylinder head by an adhesive. The invention also relates to processes for bonding valve covers to cylinder heads of internal combustion engines.

Automobile and truck engine and transmission systems have many parts which are assembled. Because many of these connections connect systems which involve the flow of fluids wherein contamination of the fluids can cause damage to the engine, it is important to both attach the parts and seal the joint between the parts. The parts are typically attached using mechanical fixturing means and sealed using gaskets, some of which are cure in place compositions. A representative system is a valve train component system. Automobile and truck engines typically have their valve train components covered with covers designed to protect the valves and internal components from a variety of external contaminants and to contain engine oil and combustion gases within the engine for proper disposal. These covers are variously referred to as valve covers, rocker covers, cam covers and the like. Traditionally these valve covers have been made from metal materials such as steel, magnesium, or aluminum. Recently, in order to reduce cost and weight, valve covers have been made from thermoset plastic materials or thermoplastic materials which can withstand the high underhood temperature environment, see for example, U.S. Pat. No. 5,492,086; U.S. Pat. No. 5,375,569; U.S. Pat. No. 5,746,168 and U.S. Pat. No. 5,363,759, incorporated herein by reference. Typically the valve covers are attached to the engine by bolting the valve cover to the cylinder head. In order to seal the internal engine components from the outside environment and contain engine oil and combustion gases a gasket is disposed between the valve cover and the cylinder head.

It is well known that some plastic materials creep when exposed to hot temperatures and pressure. This causes concern with the use of thermoplastic materials as valve covers especially, when the thermoplastic based valve covers are tightly bolted in place. Typically, the mechanical fasteners used compress the valve cover and gasket can contribute to this creep. U.S. Pat. No. 5,365,901 incorporated herein by reference discloses the use of a low creep material as a flange that is bolted to the cylinder head wherein the valve cover is mechanically or chemically locked to the flange.

The problem with traditional valve covers is that assembly of a valve cover to an engine is labor intensive and requires costly mechanical fixing devices, such as bolts and threaded bolt holes. The need to use threaded bolt holes also requires significant machining and cost. In addition, the traditional means of assembly requires the use of a gasket to seal between the valve cover and the cylinder head. This too requires significant labor. Further, gaskets tend to creep and crack with age resulting in leaks which impact engine performance and require costly repairs.

Jones et al, U.S. Patent Application 2002-0112684 (incorporated herein by reference) discloses a valve cover adhesively bonded to an engine head wherein the adhesive has sufficient strength to hold the valve cover in place during normal operating conditions, see paragraph 0007. Adhesives disclosed as preferable include a high temperature epoxy resin, a polyimide, a hybrid polyimide/epoxy resin adhesive, a silicone, a fluorosilicone, an alkylborane initiated acrylic adhesive system, or an epoxy novolac/nitrile rubber adhesive, see paragraph 0026.

A problem in bonding a valve cover to an engine head is selecting an adhesive which meets the stringent requirements necessary for use under the operating conditions of a vehicle. The adhesive must maintain strength sufficient to hold the valve cover in place over the life of a vehicle when exposed to hydrocarbons at elevated temperatures of upwards from 150° C. for extended periods of time. Additionally, the adhesive must have sufficient ductility to maintain a seal at low temperatures at which the vehicle may be exposed in northern winters. After assembly, the engine is exposed to a low pressure test to insure it is properly sealed. One location which needs to be sealed is the junction between the valve cover and the engine head. Thus the adhesive needs to form a sufficient seal at engine assembly to seal against leaks during the low pressure testing and to hold the valve cover in place during the testing.

What is needed is a system of bonding parts to an engine or a transmission wherein the system is capable of handling the temperatures, pressures and exposures to a variety of chemicals as found in automotive engine and transmission systems. What is needed is a valve cover bonded to an engine head with an adhesive which has good high temperature strength properties, good hydrocarbon resistance at high temperatures and good ductility to seal the juncture between the valve cover and the engine head at a wide range of temperatures. Additionally, an adhesive which maintains its properties over the life expectancy of the vehicle is needed and which has sufficient strength and ductility to hold engine and transmission parts in place and seal the joints between the parts and the engine or transmission. An adhesive which also has sufficient strength shortly after assembly of the valve cover to the engine head to provide a seal during the low pressure leak test is needed.

SUMMARY OF THE INVENTION

In one embodiment the invention is a system and method for bonding parts to an engine or a transmission which comprises contacting with the part or the location of the engine or the transmission to which the part is to be attached an adhesive comprising a polythiol ether having two or more reactive groups capable of reacting with a curing agent and a curing agent for the polythiol ether and thereafter contacting the part with the engine or transmission such that the adhesive is disposed between them and curing the adhesive. In another embodiment, the invention is a valve cover assembly comprising a valve cover wherein the valve cover has a mating surface adapted to be attached to a cylinder head of an internal combustion engine having a continuous bead of adhesive disposed on the perimeter of the mating surface wherein the adhesive comprises a polythiol ether having two or more reactive groups capable of reacting with a curing agent and a curing agent for the polythiol ether. Preferably the valve cover does not have bolt holes adapted to serve the primary function of holding the valve cover in place.

In another embodiment the invention is an engine assembly comprising one or more valve covers which preferably do not have bolt holes adapted to hold the one or more valve covers in place, wherein each valve cover has a mating surface and one or more cylinder heads wherein each cylinder head has mating surfaces adapted to fit to the mating surfaces of the valve covers wherein each valve cover is adhesively bonded to a cylinder head along such mating surfaces wherein the adhesive comprises a polythiol ether having two or more reactive groups capable of reacting with a curing agent and a curing agent for the polythiol ether. A continuous layer of adhesive is disposed between the mating surfaces of each valve cover and the cylinder head to which each valve cover is bonded. The continuous layer of adhesive forms a seal between the mating surface of each valve cover and cylinder head.

In yet another embodiment the invention is a method for bonding a valve cover to a cylinder head comprising a) applying to either of a cylinder head or a valve cover, wherein the valve cover and the cylinder head each have mating surfaces adapted to be mated, a continuous bead of adhesive on the mating surface of the cylinder head or the valve cover;

b) contacting the mating surface of the valve cover with the mating surface of the cylinder head such the continuous bead of adhesive is disposed between the mating surfaces of the valve cover and the cylinder head; and c) curing the adhesive to form a permanent bond between the mating surfaces of the valve cover and the cylinder head wherein the adhesive form is a seal between the valve cover and the cylinder head; wherein the adhesive comprises a polythiol ether having two or more reactive groups capable of reacting with a curing agent and a curing agent for the polythiol ether.

The invention provides means of assembling a part, such as a valve cover, to an engine or a transmission without the need for expensive mechanical attachment means, the need for a gasket and or the need to specially prepare the mating surface of either the part, such as a valve cover, or the engine or transmission, such as the cylinder head. The invention allows assembly of an engine with a significant reduction in the amount of labor needed to assemble the engine. Further, the invention allows assembly of an engine or transmission without the need to exert compression on either the seal or the part to hold it in place. The adhesive provides a seal and holds the part in place under a variety of extreme conditions. The adhesive composition exhibits sufficient green strength upon application that it is strong enough to hold the valve cover in place during low pressure testing and also provides sufficient sealing to render the assembly leak proof.

DETAILED DESCRIPTION OF INVENTION

Figure 1:
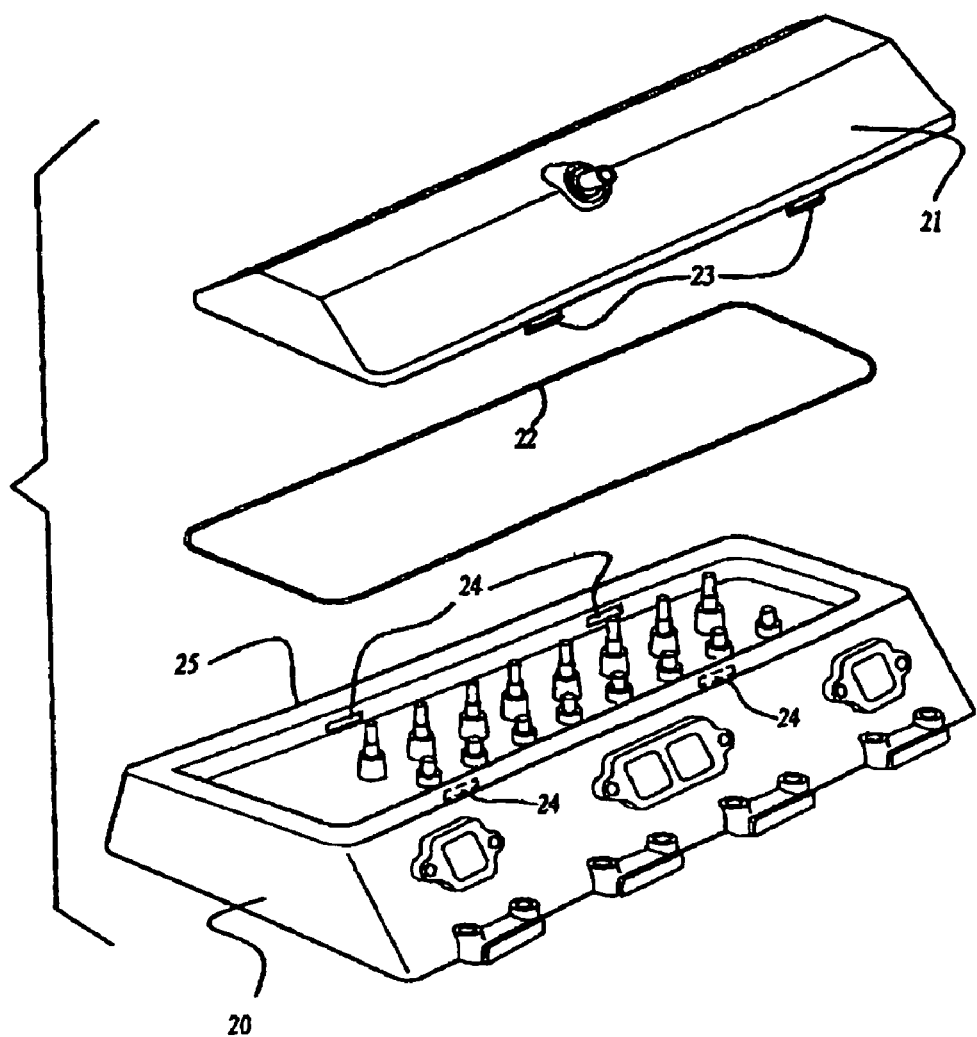
FIG. 1 shows an exploded view of a valve cover cylinder head assembly of the invention.

The adhesive composition useful in bonding parts to engines or transmissions comprises a polythiol ether and a curing agent for the polythiol ether. A polythiol ether comprises a polymer having one or more thiol ethers in the backbone of the polymer and further comprises two or more reactive groups. The reactive groups are moieties which are capable of reacting with another compound capable of curing the polymer that is a crosslinking agent. Thiol ether is a sulfur atom located between two hydrocarbon groups. Preferably the hydrocarbon groups are alkylene, cycloalkylene or a mixture thereof. The polythiol ether based polymer may contain other functional groups which do not interfere in its functioning in the invention. The reactive groups are preferably hydroxyl, primary or secondary amino, mercapto, acrylate, isocyanato, vinyl or a combination thereof. The reactive groups are preferably hydroxyl, primary or secondary amino, mercapto or a combination thereof. Preferred reactive groups are mercapto groups. In one preferred embodiment polythiol ethers correspond one of Formulas I to IV.

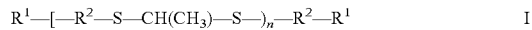

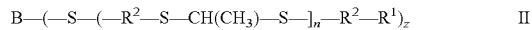

A is a structure having the formula $-R^2-[-S-(CH_2)_2-O-[-R^5-O-]_m-(CH_2)_2-S-R^2-]_n-$. B is a z-valent residue of a polyfunctionalizing agent. $R^1$ is separately in each occurrence a thiol group, a hydroxyl group, an unsubstituted amine group, a monovalent radical substituted with at least one hydroxyl group, unsubstituted amine group, or a group that is non-reactive in the presence of an acid catalyst. $R^2$ is a divalent moiety. $R^3$ is separately in each occurrence a single bond when y is 0 and $-S-(CH_2)_2-[-O-R^5]_m-O-$ when y is 1. $R^4$ is $-SH$ or $-S-(CH_2)_2-O-R^6$ when y is 0 and $-CH_2=CH_2$ or $-(CH_2-)_2-S-R^6$ when y is 1. $R^5$ is separately in each occurrence methylene, a divalent $C_{2-6}$ n-alkyl, $C_{2-6}$ branched alkyl, $C_{6-8}$ cycloalkyl or $C_{6-10}$ alkyl-cycloalkyl group or $-[(CH_2)_p-X]_q-(CH_2)_r-$. $R^6$ is $C_{1-6}$ n-alkyl which is unsubstituted or substituted with at least one $-OH$ or $-NHR^7$ group. $R^7$ is separately in each occurrence H or a $C_{1-6}$ n-alkyl group. X is separately in each occurrence O, S and $-NR^8-$. $R^8$ is separately in each occurrence H or a $C_{1-6}$ alkyl group. m is separately in each occurrence a rational number of from about 0 to about 10. n is separately in each occurrence an integer of from about 1 to about 60. p is separately in each occurrence an integer of from about 2 to about 6. q is separately in each occurrence an integer of from about 1 to about 5. r is separately in each occurrence an integer from about 2 to about 10. y is separately in each occurrence 0 or 1. z is separately in each occurrence an integer of from about 3 to about 6. Polymers described by these formulas are disclosed in DeMoss et. al. U.S. Pat. No. 5,959,071 and Zook et al U.S. Pat. No. 6,232,401 incorporated herein by reference.

Preferably $R^2$ is a divalent radical selected from the group consisting of a $C_{2-6}$ n-alkylene group, a $C_{3-6}$ branched alkylene group, a $C_{6-8}$ cycloalkylene group, a $C_{6-10}$ alkylcycloalkylene group, a $-[(CH_2)_p-X]_q-(CH_2)_r-$ group, a $-[(CH_2)_p-X]_q-(CH_2)_r-$ group in which at least one of the methylene units is substituted with a methyl group. More preferably, $R^2$ is a $-[(CH_2)_p-X]_q-(CH_2)_r-$ group. Preferably $R^4$ is SH. Preferably $R^8$ is hydrogen or methyl. X is preferably O or S and most preferably S. Preferably p and q are equal, and more preferably are 2. Preferably y is 0. Preferably z is 3.

Preferably the polythiol ether has an equivalent weight sufficient to develop high molecular weight elastomers upon curing. Preferably, the equivalent weight is about 330 or greater, more preferably about 800 or greater, most preferably about 1500 or greater. Preferably, the equivalent weight is about 10,000 or less, more preferably about 5,000 or less, most preferably about 2,000 or less. Equivalent weights are determined using titration methods.

Preferably the polythiol ethers have nominal (theoretical) functionality which facilitates crosslinking. A functionality which facilitates crosslinking is one which allows formation of a cured crosslinked network after cure of the adhesive. The selection of curing agent impacts the functionality which is needed for the polythiol ether. Generally, if the curing agent has a functionality of greater than two, then the polythiol ether can have a functionality of about two or greater. If the crosslinking agent has a functionality of about 2 then the polythiol ether should have a functionality of greater than 2. Preferably the functionality of the polythiol ether is about 2 or greater. Preferably the functionality is about 2 to about 6, more preferably about 2 to about 3 and most preferably about 2. The polythiol ether is present in the adhesive compositions in an amount sufficient to result in an adhesive which meets the preferred properties defined herein. The adhesive compositions of the invention are two part compositions. In one part is found the polythiol ether and the other part is found the curing agent. Preferably the polythiol ether is present in the polythiol ether part of the adhesive composition in an amount of about 60 percent by weight or greater, more preferably about 71 percent by weight or greater and most preferably about 75 percent by weight or greater. Preferably the polythiol ether is present in the polythiol ether part of the adhesive composition in an amount of about 95 percent by weight or less, more preferably about 85 percent by weight or less and most preferably about 76 percent by weight or less.

Preferred thiol ethers are available from PRC-Desoto of Glendale Calif. under the trademark PERMAPOL and designations 3.1 e, RW-3810-70, 5645, 5534 and the like.

The curing agents useful for this invention include any curing agent which has reactive moieties which react with the reactive groups on the polythiol ether and has sufficient functionality to form a crosslinked polymer system with the polythiol ether. Among useful curing agents are compounds having two or more functional groups comprising, hydroxyl, mercapto, primary amino, secondary amino, epoxy (glycidyl ether) groups, isocyanate groups, acrylic groups and vinyl groups. Preferred curing agents are compounds with two or more of the groups of epoxy (glycidyl ether) groups, isocyanate groups, acrylic groups and vinyl groups. More preferred curing agents are compounds having two or more epoxy or isocyanate groups, with epoxy groups being most preferred. Preferably, the curing agent has a functionality of greater than 2, more preferably from greater than 2 to about 4 and most preferably about 3 to about 4. Preferred epoxide compounds are polyepoxides known as novolac resins (epoxidized condensation products of phenol and formaldeyhde), such as DEN®* (Dow Epoxy Novolac) 438 epoxy resins (*DEN is a trademark of The Dow Chemical Company, Midland Mich.), DEN® 439 epoxy resins, ARALDITE® ECN and ARALDITE® EPN epoxy resins, such as ARALDITE® ECN 1273 epoxy resins, and ARALDITE® EPN 1180 epoxy resins (ARALDITE is a trademark of Vantico Inc.). Other preferred epoxides include DER® 732 epoxy resin, DER® 331 epoxy resin and PERMAPOL®* epoxy resins under the designations 5542 and 5534 (* PERMAPOL is a trademark of PRC-Desoto Inc). The curing agent is used in sufficient amount to cure the adhesive composition to achieve the desired properties as described herein. The curing agent is preferably present in the curing agent part of the adhesive composition in an amount of about 65 percent by eight or greater, more preferably about 75 percent by eight or greater, and most preferably about 80 percent by weight or greater. The curing agent is preferably present in an amount of about 95 percent by weight or less, more preferably about 90 percent by weight or less, and most preferably about 85 percent by weight or less.

The polythiol ether and the curing agent are generally contacted in an equivalents ratio which allows full curing of the adhesive. Preferably the equivalents ratio of polythiol ether to curing agent is 1.1:1 to about 1:1.1, more preferably about 1.05:1.0 to about 1.0:1.05 and most preferably about 1:1.

Preferably, the adhesive composition contains a filler which enhances the strength of the adhesive and which provides the desired rheological characteristics of the uncured adhesive. It is desirable that the uncured adhesive composition exhibit a sufficient viscosity to be pumpable and to hold the valve cover in place until curing is completed. More preferably the viscosity is high enough to allow the uncured adhesive to hold the engine or transmission part, such as a valve cover, in place and maintain the seal during low pressure testing of the engine prior to starting the engine. Preferably the viscosity of the final adhesive is 45 poise ($4.5N-5/m^2$) or greater, more preferably about 80 poise ($8.0-N-S/m^2$) or greater, and most preferably about 10,000 poise ($1000N-S/m^2$) or greater. Preferably the viscosity of the final adhesive is 1,000,000 poise or less ($100,000$ $N-s/m^2$), more preferably about 500,000 poise ($50,000$ $N-S/m^2$) or less, and most preferably about 100,000 poise ($10,000$ $N-S/m^2$) or less. Any filler which achieves these objectives may be used. Among preferred fillers are carbon black, silica, talc, mica, clay, nanofillers, fibers, wollastonite, metal powders and other mineral fillers. The most preferred filler is carbon black. Preferably the carbon black used has an irregular surface structure. High surface area fillers are preferred. Carbon blacks with an iodine number of about 75 mg/g or greater are preferred and about 82 mg/g or greater are more preferred. Preferably, the iodine number is about 95 mg/g or less and more preferably about 90 mg or less. Preferably the carbon black has an oil absorption number of about 100 to about 120 g/cc. The amount of filler needed to achieve the desired objective will vary depending on the choice of filler, polythiol ether and curing agent. One skilled in the art can adjust the relative amounts to fit such choices. The filler may be present in either part of the composition. It may be used to adjust the rheology of one or both sides of the adhesive composition. The filler is preferably present in the polythiol ether part of the adhesive composition in an amount of about 5 percent by weight or greater, more preferably about 15 percent by weight or greater, and most preferably about 20 percent by weight or greater. The filler is preferably present in the polythiol ether part of the adhesive composition in an amount of about 35 percent by weight or less, more preferably about 30 percent by weight or less, and most preferably about 25 percent by weight or less. The filler is preferably present in the curing agent part of the adhesive composition in an amount of about 5 percent by weight or greater, more preferably about 15 percent by weight or greater, and most preferably about 20 percent by weight or greater. Filler is preferably present in the curing agent part of the adhesive composition an amount of about 35 percent by weight or less, more preferably about 30 percent by weight or less, and most preferably about 25 percent by weight or less.

In the embodiment where in the curing agent is a high functionality resin such as a novolac resin the high functionality resin may be solid or have a very high viscosity. In order to facilitate the use of fillers in the hardener, such as an epoxy resin, containing component of the adhesive compositions, a diluent or plasticizer may be used to make the viscosity manageable. Preferably the diluent is a reactive diluent. Reactive diluents are preferred as they react into the adhesive and do not migrate in any significant way to the surface of the adhesive. Some nonreactive diluents can migrate at the high temperatures at which the engine assembly is exposed. Any diluent which is reactive with a component of the adhesive under cure conditions may be used. Preferred diluents are di or monofunctional epoxy resins or a mixture thereof. Any low viscosity monofunctional or difunctional epoxy resin may be used. In one preferred embodiment the reactive diluent is a linear aliphatic epoxy resin such as an epoxidized polyoxyalklylene ether, for example, DER® 732 epoxy resin available from The Dow Chemical Company. In another embodiment the reactive diluent is a mixture of a liquid bisphenol based epoxy resin and a monofunctional epoxy resin, such as DER® 331 epoxy based bisphenol A resin and TACTIX® 123 epoxy resin, ARALDITE® GY 50 epoxy resin and ARALDITE® LY 564 epoxy resin. Preferred linear difunctional epoxy resins include DER® 732 polyoxypropylene epoxy resin, DER® 736 polyoxypropylene epoxy resin, and ARALDITE® DY 3601 epoxy resin. Preferred monofunctional epoxy resins include phenyl glycidyl ether, cresol glycidyl ether and aliphatic glycidyl ethers, such as ARALDITE® DY 023 and ARALDITE ® DY 025 glycidyl ethers.

In order for two part adhesive compositions of the invention to be handleble each part must meet the viscosity requirements disclosed herein. Preferably the viscosity of each part of the adhesive is about 1000 poise (100 N-s/m$^2$) or greater, more preferably about 3000 poise (300 N-S/m$^2$) or greater, and most preferably about 4000 poise (400 N-S/m$^2$) or greater. Preferably the viscosity of the each part of the adhesive is about 7000 poise (700 N-S/m$^2$) or less, more preferably about 6000 poise (600 N-S/m$^2$) or less, and most preferably about 5000 poise (500 N-s/m$^2$) or less.

The adhesive may further comprise an accelerator for the cure of the polythiol ether with the curing agent. The accelerator can be any well known accelerator for the reaction between the specific reactive groups on the polythiol ether and the curing agent. In one preferred embodiment the curing agent is a polyepoxide and the accelerator is any well known accelerator for room temperature cure of polyepoxide containing compositions. Among preferred classes of accelerators are primary, secondary and tertiary aliphatic amines and aromatic amines. More preferred accelerators include primary, secondary and tertiary aliphatic amines. One particularly useful accelerator is DABCO® 33LV catalyst, a 33 percent triethylene diamine solution in dipropylene glycol. The accelerator is used in sufficient amount to facilitate the curing of the adhesive composition to the desired degree under ambient conditions. Ambient conditions mean the conditions under which the adhesive is applied to the valve cover. The accelerator is preferably present in the curing agent part of the adhesive composition in an amount of about 0.5 percent by weight or greater, more preferably about 1.0 percent by weight or greater, and most preferably about 1.5 percent by weight or greater. The accelerator is preferably present in the curing agent part in an amount of about 5 percent by weight or less, more preferably about 4 percent by weight or less, and most preferably about 2.5 percent by weight or less.

The adhesives of the invention may contain other conventional components useful in adhesive compositions, such as plasticizers, adhesion promoters, UV stabilizers, heat stabilizers, thixotropes, inhibitors and the like.

Full cure means herein the properties of the adhesive are no longer changing in a significant manner, such as lap shear strength and elongation. The adhesives of the invention preferably demonstrate a lap shear strength after full cure and exposure to hot motor oil (5W30) for 1000 hours at 150° C. of about 150 psi (1.03 mPa) or greater according to ASTM1002, more preferably about 200 psi (1.38 mPa) or greater and most preferably about 250 psi (1.72 mPa) or greater. Preferably the adhesive exhibits an elastomeric nature after cure. This is indicated by exhibiting a significant elongation at break according to ASTM D638. Preferably the adhesives of the invention exhibit an elongation at break after full cure of about 20 percent or greater, more preferably about 40 percent by weight or greater and most preferably about 50 percent by weight or greater. Preferably such adhesive does not decompose or delaminate at temperatures of up to about 280° F. (138° C.), more preferably up to about 290° F. (143° C.) and most preferably up to about 300° F. (150° C.). Furthermore, the adhesive must be able to withstand exposure to hydrocarbon materials, engine oil, calcium chloride, brake fluid, glycol coolants, windshield washer solvents and the like, at the above-mentioned temperatures and the pressures to which the internal combustion engine reaches internally. The adhesive must be able to bond to the material used to make the valve cover and to the material from which cylinder heads are prepared, such as, cast iron, aluminum and magnesium. The adhesive used is a structural adhesive which is an adhesive which has sufficient strength to hold the valve cover in place during normal operating conditions.

The adhesive compositions can be used to bond parts of an engine together or bond parts to an engine and to other power train components. Examples of parts which can be bonded to an engine include oil pan covers, timing chain covers, valve covers, and the like. The adhesive can also be used to seal any fluid containing component of the power train of a vehicle, such as, parts of the transmission system and transaxle system.

As used herein the term valve cover includes the following terms: valve covers, cam covers, rocker covers and cylinder head covers. A valve cover refers to the cover, which is placed over a cylinder head to protect be valves and internal engine components from damage due to exposure to outside elements and to contain engine oil and exhaust gases in the engine. The valve covers that are useful in this invention can be of any shape or size that performs the desired function. The valve cover can be made from any conventional material commonly used for valve covers, for instance a metal, a plastic or a plastic based composite. Preferred metals include steel, aluminum and magnesium. Plastic based materials can be thermoset plastics and thermoplastic materials. The plastic based materials can be reinforced with common reinforcement materials such as glass fibers and the like. Among useful thermoset materials are those based on epoxy, polyester, divinylbenzenes, and dicyclopentadiene resins. Among preferred thermoplastic materials are polybutylene terephthalate, polyetherimides, polyphenylene ether/polyamide resins, polyether sulfone resins, polyether ether ketone resins, liquid crystal polymers, polyarylsulfone resins, polyamideimide resins, polyphthalimide resins, nylon 6, 6 and nylon 6 polyamide resins, polypropylene, syndiotactic polystyrene, and blends thereof. Preferably, the thermoplastic material is a blend of nylon 6, 6 or nylon 6 with syndiotactic polystyrene. Such as disclosed in commonly assigned U.S. Patent Application No. 60/263,954, filed Jan. 24, 2001, titled *Toughened Polymer Blends With Improved Properties*, published as WO 02/059197, incorporated herein by reference. Common additives such as glass fibers, minerals, impact modifiers and the like may be included in the resins. From a balance of properties and cost performance standpoint the preferred thermoplastic resins are nylon 6, 6 and nylon 6 polyamide resins, syndiotactic polystyrene and blends thereof. Of classes of materials useful in fabricating valve covers, plastic materials are preferred because plastic materials are generally lighter than metals and provide greater design flexibility over metals.

The valve cover can be designed in any manner that is suitable to perform its function. A valve cover useful in the invention has a mating surface that is adapted to be mated with a mating surface of a cylinder head such that the two mating surfaces can form a tight seal therebetween with the aid of the adhesive. Any suitable design of the mating surfaces can be used. For instance the two mating surfaces may be flat all along the surfaces to be mated, they may form a lap joint, a scarf joint, a tongue in groove joint or the like.

In one embodiment the invention is a valve cover having disposed on the its mating the surface a continuous bead or film of adhesive. As used herein continuous bead or film of adhesive means a bead or film of adhesive that is disposed around the periphery of the mating surface and the end of the adhesive bead or film connects with the beginning of the adhesive bead or film. The continuous bead or film of adhesive upon cure is capable of forming an air and liquid tight seal between the valve cover and cylinder head. This function allows the adhesive bead or film to replace gaskets as the sealing means between valve covers and cylinder heads. The adhesive may be applied to the valve cover in the immediate vicinity of the location where the valve cover is to be contacted with the cylinder head or it may be applied in a location remote from the place where the valve cover and a cylinder head are to be contacted. Remote as used herein refers to one or both of time and location.

In one embodiment the valve cover can contain an integral mechanical fastening means which is adapted to hold the valve cover in place on the cylinder head until the adhesive cures. Such integral mechanical fastening means as used herein means a simple means to hold the valve cover and cylinder head together for a relatively short period of time while the adhesive cures. Such means is not designed to hold the parts together during operation of an engine. By integral is meant that the fastening means is part of the valve cover, cylinder head or both. Examples of such fastening means include integral spring clips, snap fit mechanisms, screws, bolts and the like. Such fastening means can be strategically located along the valve cover and the cylinder head interface or can be located along the entire cylinder head valve cover interface. In a preferred embodiment the mechanical fastening means is a snap fit means. Preferably the mechanical fastening means is located on the inside portion of the valve cover and cylinder head, wherein inside portion refers to the inside of the engine and valve cover. This is preferred because the fastening means cannot be seen from the exterior of the engine. In another embodiment the valve cover may have protruding from its mating surface a leg or protrusion adapted to guide the valve cover or hold the valve cover along its mating surface in proper relationship to the cylinder head. In some embodiments, the cylinder head may have a matching indentation or groove adapted to work with the leg or protrusion to aid in holding the valve cover and cylinder head in proper alignment. In another embodiment, one or more bolts and bolt holes can be included in the valve cover for a purpose other than attachment purposes, such as alignment purposes or for attaching other items to the valve cover. In some embodiments such a bolt or screw can have a matching female threaded receptacle in the cylinder head. The primary function such bolts or screws is to attach peripheral items to the valve cover.

In another embodiment the invention is an engine assembly wherein the valve cover as described herein is bonded to a cylinder head with the adhesives disposed between the valve cover and the cylinder head. The adhesive is in the form of a continuous bead or film such that it forms a seal along the entire juncture between the valve cover and cylinder head. Such engine assembly by virtue of the use of adhesive bonding and plastic valve covers enable the use of the valve cover in a multi-functional way such that other parts and functions can be incorporated into the valve cover and the engine assembly.

In preparation of the engine assembly the adhesive is applied to the valve cover or the cylinder head by contacting the adhesive in a conventional fashion with the mating surface to form a continuous bead or film. The adhesive may be coated, extruded brushed or the like, onto the surface. Preferably the adhesive is applied to the mating surface of the valve cover. In a preferred embodiment the adhesive is applied as a continuous bead or film along the mating surface of the valve cover. The adhesive can be applied immediately before contacting the valve cover with the cylinder head or it can be applied in remote location from the location where the valve cover is bonded to the cylinder head or at an earlier time with respect to the bonding operation. In the embodiment where the adhesive is applied just prior to contacting the valve cover and the cylinder head, any adhesive which meets the performance criteria defined above may be used. In the embodiment where the adhesive is applied in a remote location or at a remote time, an appropriate cure-on-demand adhesive may be used. A cure-on-demand adhesive is exposed to conditions such that it will cure and thereby bond the valve cover to the cylinder head and form a seal between them. Such conditions can be applied prior to contacting the cylinder head with the valve cover or after such contacting. It is well within the average level of skill in the art to determine which operation may be used to cure the adhesive and when it should be performed. In one embodiment the operation may be an operation that is inherent in the assembly of an automobile or in the running of an automobile.

In the embodiment where a two part adhesive is used, the two parts are contacted prior to application to the valve cover or engine head. The contacting is preferably achieved in a mixing head of an extrusion apparatus. This contacting generally occurs just before extrusion on the substrate surface. Extrusion and application can be performed with a manual device like a caulking gun having two reservoirs and a mixing chamber. Alternatively the adhesive can be applied using extrusion equipment with automatic feeding and extrusion. Such apparatus are well known in the art. When a two part adhesive is used the adhesive preferably goes through two cure steps. First the adhesive is B-staged upon mixing at room temperature. This B-staging usually takes a short period of time during which the adhesive composition can be worked with. This is often referred to as the working time. The working time should not be as short as to inhibit the ability of an installer to efficiently apply the adhesive and contact the substrates and not so long as to require additional steps to secure the substrates in place while the cure is proceeding. Preferably the working time is about 20 seconds or greater and more preferably about 2 minutes or greater. Preferably the working time is 10 minutes or less and more preferably 5 minutes or less. The second cure step which imparts to the adhesive composition its final high strength, hydrocarbon resistance and high temperature stability requires exposure to high temperatures. The engine assembly can be heated by any conventional means using an external heat source well known the art. Preferably the heat generated by the engine is sufficient to cure the adhesive for the second cure step. Preferably the cure is accomplished by heating the adhesive at a temperature of about 120° C. or greater, and most preferably about 130° C. Preferably the cure is accomplished by heating the adhesive at a temperature of about 150° C. or less. The area of the assembly where the adhesive is located is heated to such temperatures for a time period sufficient to result in cure as evidenced by achievement of the desired adhesive properties as disclosed herein. Preferably the cure is accomplished by heating the adhesive at such temperatures for a time period of about 60 minutes or less, more preferably about 45 minutes or less and most preferably about 15 minutes or less.

Preferably a primer is applied to each substrate before contacting the adhesive with the substrates. The primers facilitate adhesion to the surfaces. The primer used comprises a film forming resin (for example VITEL® 2300 BU polyester resin), a crosslinker for the film forming resin (for example DESMODUR® N-100 or RFE isocyanates) and one or more silane coupling agents including mercapto, amino or epoxy silane coupling agents (for example SILQUEST® A-189 silane, SILQUEST® A-187 silane or SILQUEST® A1100 silane).

In another embodiment the engine part, such as a valve cover, may include an integrated acoustic management system designed to prevent the noise inherent in the operation of an internal combustion engine from escaping the engine compartment. In one embodiment a valve cover can comprise two parts one being an outer shell and the other being an inner shell adapted such that the inner shall is located within the outer shell such that there is a gap between the two. The gap may simply contain air which can attenuate certain sound waves thereby reducing the noise that can be heard outside the engine. Alternatively, the gap can be filled with a sound deadening material such as shoddy pad, nonwoven mat, elastomeric material or foam material. In another embodiment the valve cover may have bound to its inner surface a sound attenuating material such as the elastomer or foam.

In another embodiment the parts used in the invention, such as a valve cover, can comprise a coating or film on the exterior or interior which functions to improve the barrier properties of the valve cover to hydrocarbons. Such a coating of film can reduce the fugitive hydrocarbon emission from an automobile. Any coating or film which prevents the transmission of hydrocarbons through the engine part ver may be used. A preferred coating is a carbon-silica based plasma deposited coating as described in U.S. Pat. No. 5,298,587; U.S. Pat. No. 5,320,875; U.S. Pat. No. 5,433,786 and U.S. Pat. No. 5,494,712, incorporated herein by reference.

To illustrate the invention the figures are described below. The figures are provided to aid in illustrating the invention and are not intended to limit the scope of the claims hereinafter. FIG. 1 shows an exploded view of a valve cover cylinder head assembly. The figure shows a cylinder head (20) and a valve cover (21) having a continuous bead of adhesive (22) located between them. The valve cover (21) has integral snap fit clips (23) adapted to hold the valve cover (21) in place on the cylinder head (20) while the adhesive bead (22) cures. The cylinder head (20) has matching indentations (24) which match with the snap fit clips (23) which receive the clips (23) and function to hold the valve cover (21) in place. Also visible in the figure is the mating surface of the cylinder head (25) adapted to mate with the corresponding mating surface of the valve cover (not shown).

Figure 2:
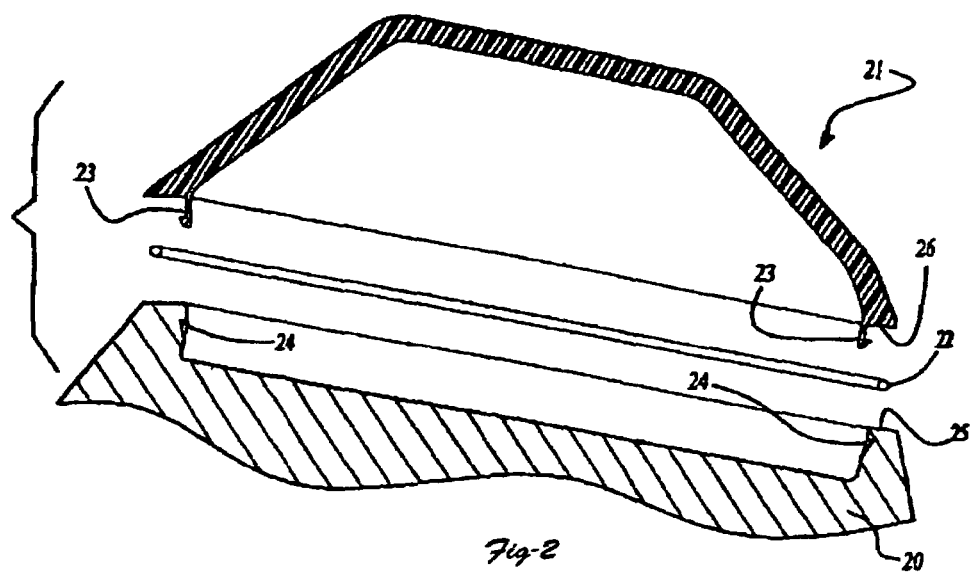
FIG. 2 shows a cut away view exploded view of a valve cover and cylinder head assembly.

FIG. 2 shows a cut away view exploded view of a valve cover (21) and cylinder head (20) assembly. The exploded view shows the cut away of a cylinder head (20) a valve cover (21) and located therebetween is an adhesive bead (22). The adhesive bead (22) is located between the mating surface of the cylinder head (25) and the mating surface of the valve cover (26). The cylinder head (20) has an indentation (24) adapted to mate with the snap fit clips (23) of the valve cover (21).

Figure 3:
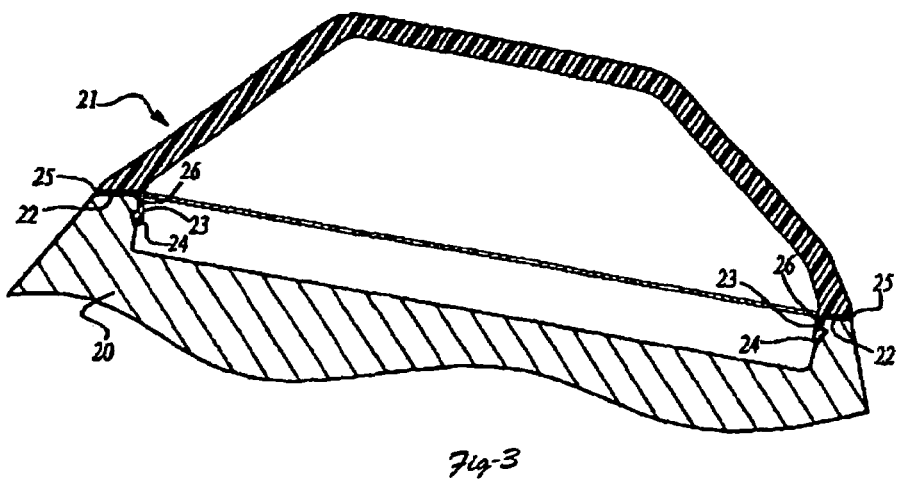
FIG. 3 shows an unexploded cut away view of the valve cover cylinder head assembly.

FIG. 3 shows an unexploded cut away view of the valve cover (21) cylinder head (20) assembly. Shown is a cylinder head (20) with a valve cover (21) adhesively bound together by a continuous bead of adhesive (22) along the mating surface of the cylinder head (25) and the mating surface of the valve cover (26). Also shown is a snap fit clip (23) integrated with the valve cover (21) and engaged with the cylinder head (20) by the indentation (24) adapted to hold the snap fit clip (23) in place. The snap fit clips (23) are located in the inside of the valve cover (20) and cylinder head (20) assembly. This is desirable for cosmetic reasons.

Specific Embodiments

The following examples are included for illustrative purposes only and are not intended to limit the scope of the claims. Unless otherwise stated all parts and percentages are by weight.

Ingredients

The following ingredients were used in the examples provided hereinafter:

PERMAPOL® 3.1e thiol (mercaptan) terminated polythioether having a molecular weight of 3260 (1630 equivalent weight) available from PRC-Desoto, Glendale, Calif.

CABOT® 652A carbon black available form Cabot Corporation, Boston, Mass.

DABCO® 33LV 33 percent triethylene diamine in dipropylene glycol available from Air Products DEN® 438 novolac epoxy resin having an equivalent weight of 179 available from The Dow Chemical Company, Midland Mich.

DER® 732 polyoxypropylene diepoxide having an equivalent weight of 320 available from The Dow Chemical Company, Midland Mich.

Adhesive Preparation Procedure

One part was prepared by charging PERMAPOL® 3.1e thiol (mercaptan) functional polythiol ether and DABCO 33LV catalyst to a Hauschild speed mixer and mixing for 17 seconds. Half of the carbon black was added and the resulting mixture was mixed twice consecutively for 17 seconds durations. The remaining amount of carbon black was added and the mixture was mixed twice consecutively for 17 second durations. The viscosity was 8,000 poise (800 N-S/m$^2$). The tube of resin was then removed from the Speed mixer. The second part was prepared by charging DER® 732 polyoxypropylene diepoxide and DEN® 438 epoxy novolac in a 30/70 percent by weight mixture to the speed mixer with carbon black and mixing it twice consecutively for 17 second durations. The tube of resin was removed from the mixture. The viscosity was 4000 poise (400 N-S/m$^2$).

The components of the resulting composition are listed below in Table 1.

TABLE I

| Component | Weight grams | Weight percent |
|---|---|---|
| Part A | | |
| PERMAPOL ® 3.1E polythiol ether | 32.59 | 75.20 |
| DABCO ® 333 LV catalyst | 0.67 | 1.55 |
| Carbon Black | 10.08 | 23.26 |
| Part B | | |
| Novolac resin | 21.67 | 55.91 |
| DER ® 732 diepoxide | 9.29 | 23.96 |
| Carbon Black | 7.80 | 20.12 |

Adhesive compositions as described above were test using the following procedure. All samples were nylon bonded to aluminum with one inch overlap. The samples were placed in the oil (5W30 motor oil) at 150° C. for the time described hereinafter. The samples were tested according to ASTM1002. The substrate used in the lap shear construction was QUESTRA® syndiotactic polystyrene/nylon blend and aluminum strips. The one inch overlap areas of the aluminum strips were sanded on a bench sander, wiped with ethanol, cleaned with acetone and then wiped with ethanol. The surfaces of the lap shears were primed, using a composition as described before. The specimens were allowed to set for sixty minutes to allow the solvents in the primer to evaporate away. Adhesive as described in the examples was applied to the lap shear surfaces using 30 mil (0.076 cm) glass beads as spacers. Aluminum strips were bonded to nylon strips and they were held in place using butterfly clips. The samples were placed in an oven immediately after bonding and baked for 1 hour at 300° F. (149° C.). After removal from the oven, the samples were allowed to cool for 24 hours before testing. The samples were placed in a container of oil that was subsequently placed in an oven at 150° C. These samples were removed at various intervals; some were tested immediately; after removal others were allowed to cool for 24-hours and then tested. The samples were placed in the cross-heads on an Instrom (7 inch (17.8 cm) separation) and pulled at a rate of 5 in/min (12.7 cm/inch) until failure. The results are compiled in Table 2.

Three samples were tested under each condition. The results are compiled along with the average of the three samples under each condition. Time in Table refers to length of time each sample remained in oil at 150° C.

TABLE 2

| Time (hr) | Sample 1 psi | (mPa) | Failure | Sample 2 psi | (mPa) | Failure | Sample 3 psi | (mPa) | Failure | Average psi | (mPa) |
|---|---|---|---|---|---|---|---|---|---|---|---|
| These samples were cooled for 24 hours before testing. | | | | | | | | | | | |
| 0 | 758 | (523) | 100% CF | 726 | (5.01) | 100% CF | 697 | (4.81) | 100% CF | 727 | (5.01) |
| 124 | 493 | (3.40) | 90% CF 10% AF | 418 | (2.88) | 80% CF 20% AF | 505 | (3.48) | 90% CF 10% AF | 472 | (3.25) |
| 270 | 240 | (1.65) | 30% CF 70% AF | 464 | (3.20) | 75% CF 25% AF | 635 | (4.38) | 90% CF 10% AF | 446 | (3.08) |
| 357 | 430 | (2.96) | 60% CF 40% AF | 321 | (2.21) | 60% CF 40% AF | 401 | (2.76) | 90% CF 10% AF | 385 | (2.65) |
| 506 | 377 | (2.60) | 80% CF 20% AF | 270 | (1.86) | 75% CF 25% AF | 237 | (1.63) | 60% CF 40% AF | 295 | (2.03) |
| 628 | 207 | (1.43) | 50% AF 50% PF | 309 | (2.13) | 20% CF 70% AF 10% PF | 256 | (1.77) | 15% CF 80% AF 5% PF | 258 | (1.78) |
| 771 | 350 | (2.41) | 20% CF 75% AF 5% PF | 250 | (1.72) | 100% AF | 226 | (1.56) | 30% CF 70% AF | 276 | (1.90) |
| 865 | 236 | (1.63) | 100% AF | 231 | (1.59) | 70% AF 30% PF | 284 | (1.96) | 70% AF 30% PF | 250 | (1.72) |
| 1004 | 202 | (1.39) | 10% CF 80% AF 10% PF | 248 | (1.71) | 100% AF | 239 | (1.65) | 100% AF | 230 | (1.59) |
| These samples were tested immediately after removal from the oven | | | | | | | | | | | |
| 0 | 215 | (1.48) | 65% CF 35% AF | 142 | (.979) | 35% CF 65% AF | 199 | (1.37) | 65% CF 35% AF | 185 | (1.28) |
| 357 | 101 | (.696) | 40% TCF 40% AF 20% PF | 110 | (.758) | 40% CF 30% AF 30% PF | 165 | (1.14) | 70% CF 30% PF | 12.5 | (.861) |
| 771 | 128 | (.882) | 15% CF 85% AF | 173 | (1.19) | 45% CF 50% AF 5% PF | 174 | (1.20) | 80% CF 20% PF | 158 | (1.09) |
| 1004 | 22 | (.15) | 30% CF 70% AF | 70 | (.48) | 35% CF 65% AF | 103 | (.710) | 45% CF 50% AF 5% PF | 65 | (.448) |

Notes:
CF = Cohesive; Failure;
AF = Adhesive Failure;
PF = Primer Failure

What is claimed is:

1. A valve cover assembly comprising a valve cover having a mating surface adapted to be attached to a cylinder head of an internal combustion engine having a continuous bead of an adhesive disposed on the perimeter of the mating surface of the valve cover wherein the adhesive comprises a polythiol ether having two or more reactive groups capable of reacting with a crosslinking agent and a crosslinking agent.

2. A valve cover assembly according to claim 1 wherein the valve cover does not have bolt holes which have a primary function of holding the valve cover to the cylinder head.

3. A valve cover assembly according to claim 1 wherein the adhesive is a two-part adhesive comprising in one part a polythiol ether having two or more reactive groups and in another part a curing agent for the polythiol ether and an accelerator for the cure of the polythiol ether.

4. A valve cover assembly according to claim 3 wherein the reactive groups are one or more of hydroxyl, primary or secondary amino, mercapto groups.

5. A valve cover according to claim 3 wherein the curing agent is one or more of polyepoxides, isocyanates, acrylates or vinyl containing compound.

6. A valve cover assembly according to claim 4 wherein the adhesive composition further comprises a filler.

7. An engine assembly comprising one or more valve covers having mating surfaces and one or more cylinder heads having mating surfaces adapted to fit to the mating surfaces of the valve covers wherein each valve cover is adhesively bonded to a cylinder head wherein a continuous layer of adhesive is disposed between the mating surfaces of each valve cover and the cylinder head to which each valve cover is bonded, wherein the continuous layer of adhesive forms a seal between the mating surface of each valve cover and cylinder head pair such that the transmission of gasses and liquids between each valve cover and cylinder head pair where the mating surfaces are in contact is significantly reduced or prevented wherein the adhesive comprises a polythiol ether having two or more reactive groups capable of reacting with a crosslinking agent and a crosslinking agent.

8. An engine assembly according to claim 7 wherein the adhesive is a two part adhesive comprising in one part a polythiol ether having two or more reactive groups and in another part a curing agent for the polythiol ether and an accelerator for the cure of the polythiol ether.

9. An engine assembly according to claim 8 wherein the reactive groups are one or more of hydroxyl, primary or secondary amino, mercapto groups.

10. An engine assembly according to claim 8 wherein the curing agent is one or more of polyepoxides, isocyanates, acrylates, vinyl containing compounds or a mixture thereof.

11. An engine assembly according to claim 9 wherein the adhesive composition further comprises a filler.

12. An engine assembly according to claim 7 wherein the adhesive composition exhibits a lap shear strength of about 200 psi or greater 20 minutes after assembly.

13. An engine assembly according to claim 8 wherein the adhesive composition is cured by heat.

14. An engine assembly according to claim 13 wherein the cured adhesive exhibits a lap shear strength of about 450 psi or greater after cure.

15. A method for bonding a valve cover to a cylinder head comprising
   a) applying to the valve cover or the cylinder head, wherein the valve cover has a mating surface adapted to be mated with a mating surface of a cylinder head, a continuous bead or film of adhesive along the entire mating surface of the valve cover or the cylinder head;
   b) contacting the mating surface of the valve cover with the mating surface of the cylinder head such the continuous bead or film of adhesive is disposed between the mating surfaces of the valve cover and the cylinder head;
   c) curing the adhesive to form a permanent bond between the mating surfaces of the valve cover and the cylinder head wherein the adhesive forms a seal between the valve cover and the cylinder head,
   wherein the adhesive comprises a polythiol ether having two or more reactive groups capable of reacting with a crosslinking agent and a crosslinking agent and the adhesive has sufficient strength after application to hold the one of more valve covers in place.

16. A method according to claim 15 wherein the adhesive is cured by exposure to a heat source.

17. A method according to claim 16 wherein the adhesive is cured by the heat of the engine during operation of the engine.

18. The method of claim 16 wherein the valve cover mating surface and the cylinder head mating surface are maintained in contact, with the adhesive bead or film disposed between them, through the use of a mechanical fastening means other than bolts.

19. A method of bonding a part to an automobile engine or transmission which comprises contacting an adhesive comprising a polythiol ether having two or more reactive groups and a curing agent for the polythiol ether with one or both of the part or the automobile engine or transmission, contacting the part and the engine or transmission with the adhesive located between the parts and curing the adhesive so that the joint between the part and the engine or transmission is sealed.

* * * * *